US007000568B1

(12) United States Patent
Mihlbauer

(10) Patent No.: US 7,000,568 B1
(45) Date of Patent: Feb. 21, 2006

(54) AQUARIUM OVERFLOW SYSTEM STANDPIPE

(75) Inventor: Brad L. Mihlbauer, Muskego, WI (US)

(73) Assignee: All-Glass Aquarium Company Inc., Franklin, WI (US)

( * ) Notice: Subject to any disclaimer, the term of this patent is extended or adjusted under 35 U.S.C. 154(b) by 0 days.

(21) Appl. No.: 10/636,937

(22) Filed: Aug. 7, 2003

(51) Int. Cl.
*A01K 63/04* (2006.01)
(52) U.S. Cl. ...................................... 119/263
(58) Field of Classification Search ................ 119/263; 210/120, 133
See application file for complete search history.

(56) References Cited

U.S. PATENT DOCUMENTS

| | | | |
|---|---|---|---|
| 4,684,462 A | 8/1987 | Augustyniak | 210/97 |
| 4,817,561 A * | 4/1989 | Byrne et al. | 119/260 |
| 5,626,747 A | 5/1997 | Ritzow et al. | 210/169 |
| 5,632,220 A * | 5/1997 | Vento | 114/255 |
| 5,876,639 A * | 3/1999 | Campau | 261/36.1 |
| 5,942,105 A | 8/1999 | Leis | 210/129 |
| 6,073,585 A * | 6/2000 | Horvath | 119/256 |

OTHER PUBLICATIONS

Richard Durso, "Build Your Own Durso Standpipe", Jan. 1, 1999, Internet Web Page, 4 pages, taken from http://web.archive.org/web/20040205210415/http://www.dursostandpipes.com/.*
Ken Stockman, "Kan Stockman's Standpipe Implementation-Compact Design for Hang-on Overflow Boxes", Jan. 1, 2000, Internet Web Page, 2 pages, taken from http://www.rl180reef.com/pages/standpipe/standpipe-ken_stockman.htm.*
Richard Durso, "Build You Own Standpipe", Jan. 1, 1999, Internet Web Page, 1 page, taken from http://web.archive.org/web/20040205210415/http://www.dursostandpipes.com/.*
"Custom Overflow & Stand Pipe", Known as the Durso Standpipe, Print Out May 7, 2003 of Web Page http://www.rl180reef.com/pages/standpipe/standpipe-open.htm, Updated: Feb. 2002, noting picture taken Mar. 1999.
"Durso Standpipe for AGA Small Overflows", Print Out May 7, 2003 of Web Page http://www.rl180reef.com/pages/standpipe/standpipe-aga.htm, Pictures date 2000.
All-Glass Aquarium 2001 Catalog, Part No. AGA800, p. 7.
"Jetstream . . . The Strong, Silient Type", Marlineland Perfecto Manufacturing, High-low Overflow Tube, High-low Return Tube,.2001.

* cited by examiner

*Primary Examiner*—Teri Pham Luu
*Assistant Examiner*—Bret Hayes
(74) *Attorney, Agent, or Firm*—Andrus, Sceales, Starke & Sawall, LLP

(57) ABSTRACT

An aquarium overflow system includes a standpipe with snap-fit mounting constructions, an air vent, air and water apertures, and an adjustable height version.

3 Claims, 6 Drawing Sheets

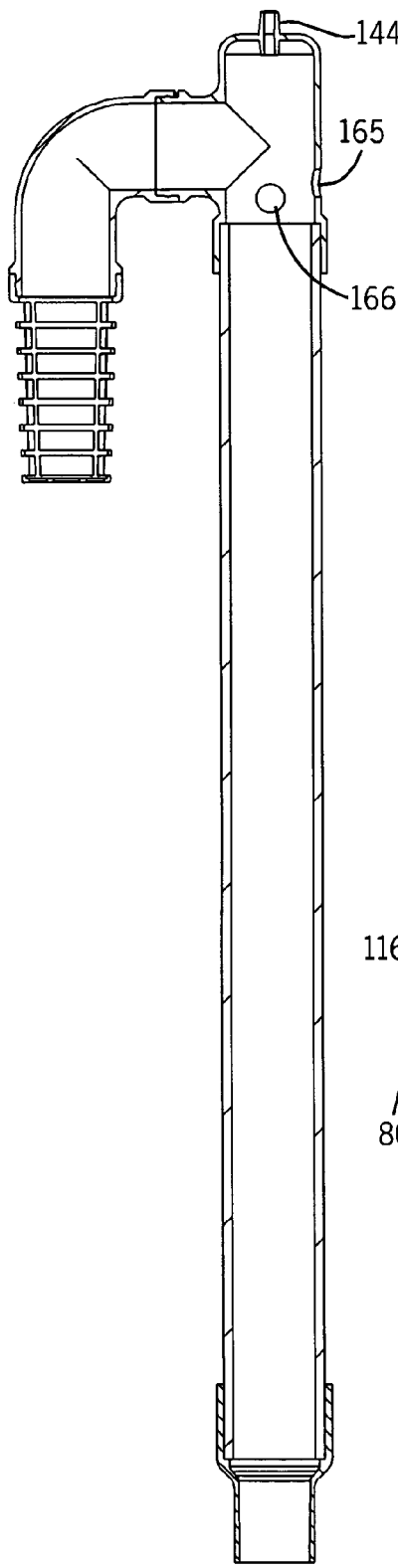
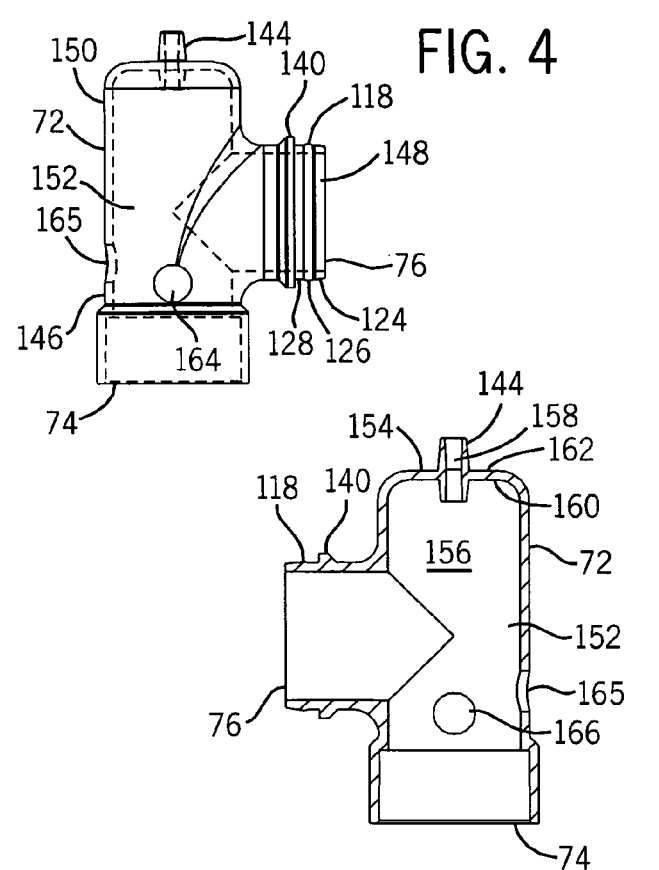
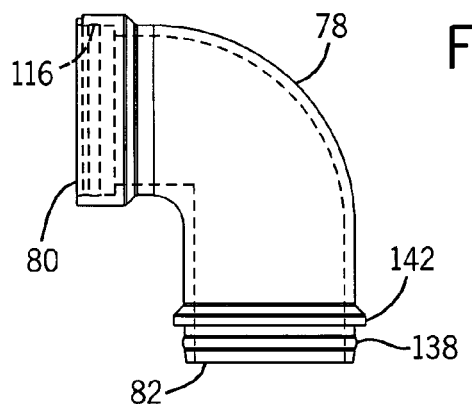
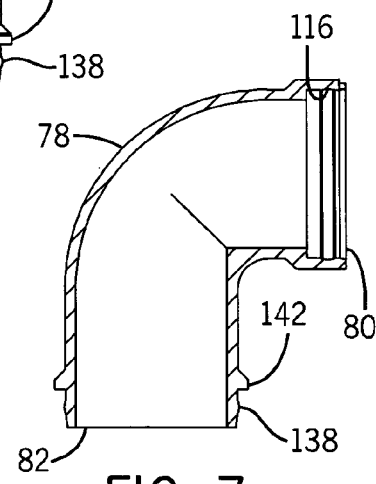
FIG. 3
FIG. 4
FIG. 5
FIG. 6
FIG. 7

AQUARIUM OVERFLOW SYSTEM STANDPIPE

BACKGROUND AND SUMMARY OF THE INVENTION

The invention relates to an aquarium, and more particularly the overflow standpipe.

Aquarium overflow systems are known in the prior art. The overflow system uses a standpipe having an upper inlet receiving water from the aquarium tank and delivering the water to a pump and filter, which water is then returned to the tank.

The present invention evolved during continuing improvements directed to the standpipe construction.

BRIEF DESCRIPTION OF THE DRAWINGS

FIG. 3 is a sectional view of the standpipe of FIGS. 1 and 2.

FIG. 4 is a side elevation view of one of the components of FIG. 3.

FIG. 5 is a sectional view of the component of FIG. 4.

FIG. 6 is a side elevation view of another component of FIG. 3.

FIG. 7 is a sectional view of the component of FIG. 6.

DETAILED DESCRIPTION

Figure 1:
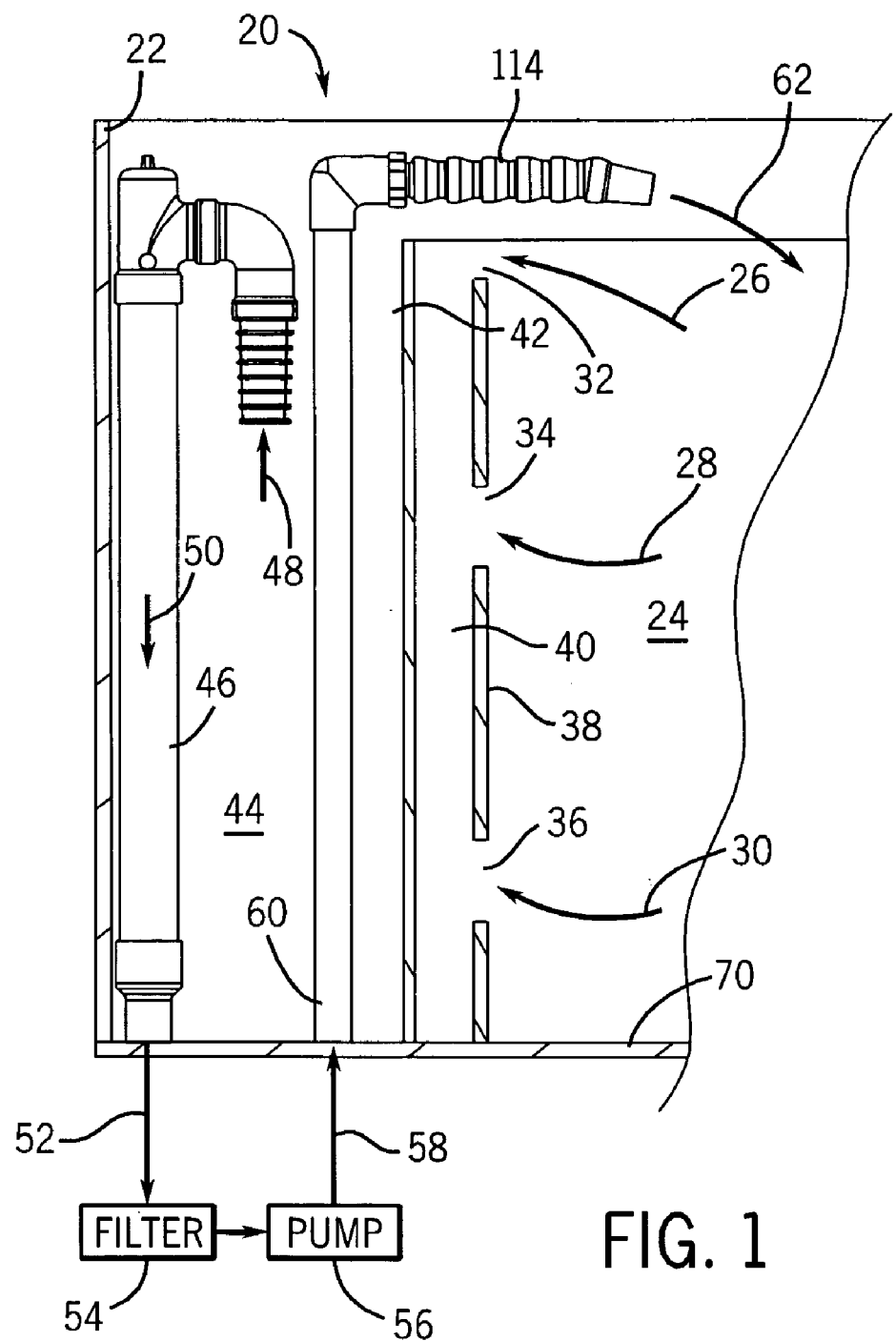
FIG. 1 illustrates an aquarium overflow system in accordance with the invention.
Figure 2:
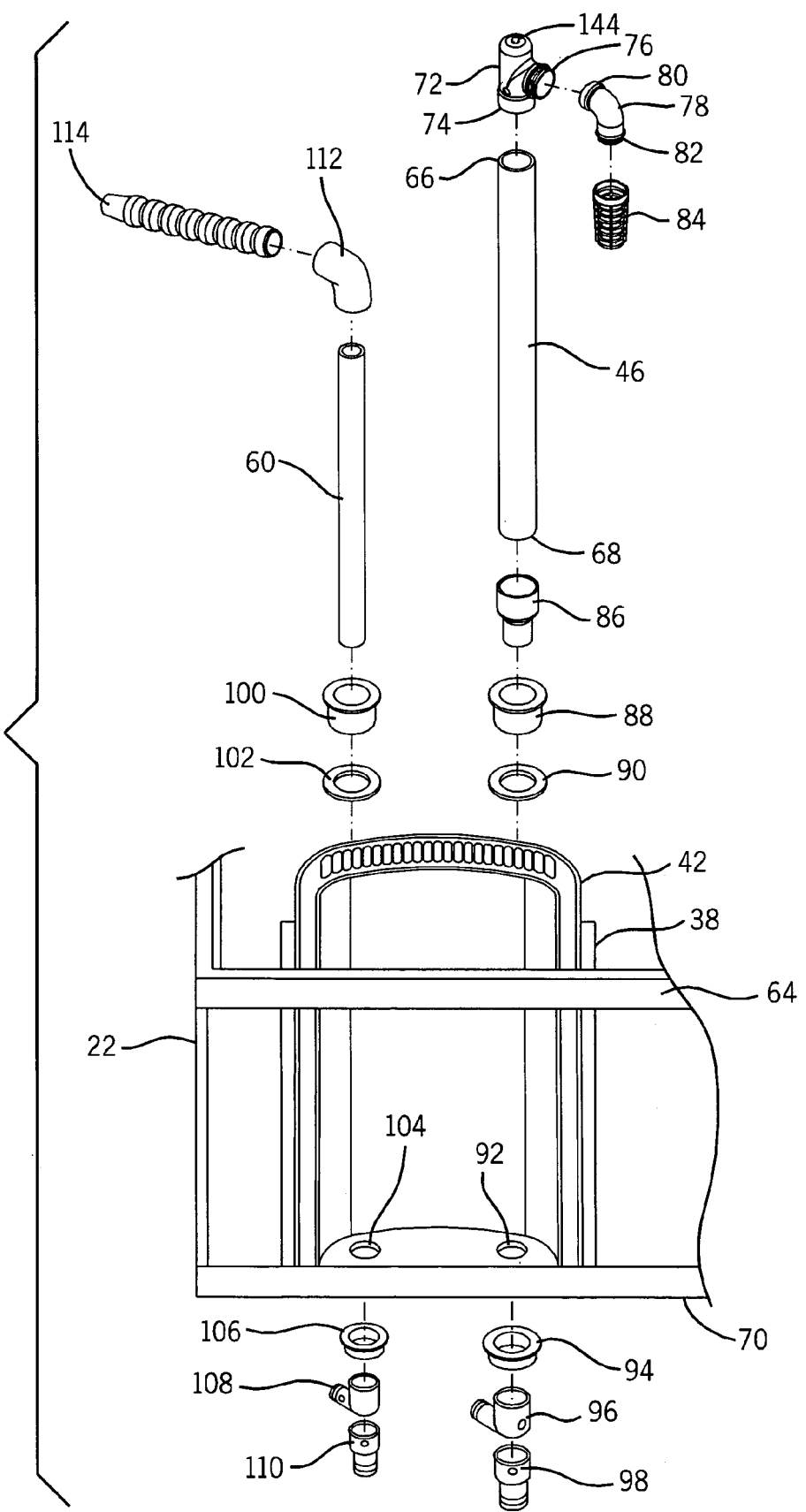
FIG. 2 is an exploded perspective view of components of FIG. 1.
Figure 8:
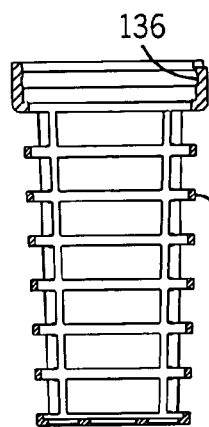
FIG. 8 is a sectional view of another component of FIG. 3.
Figure 11:
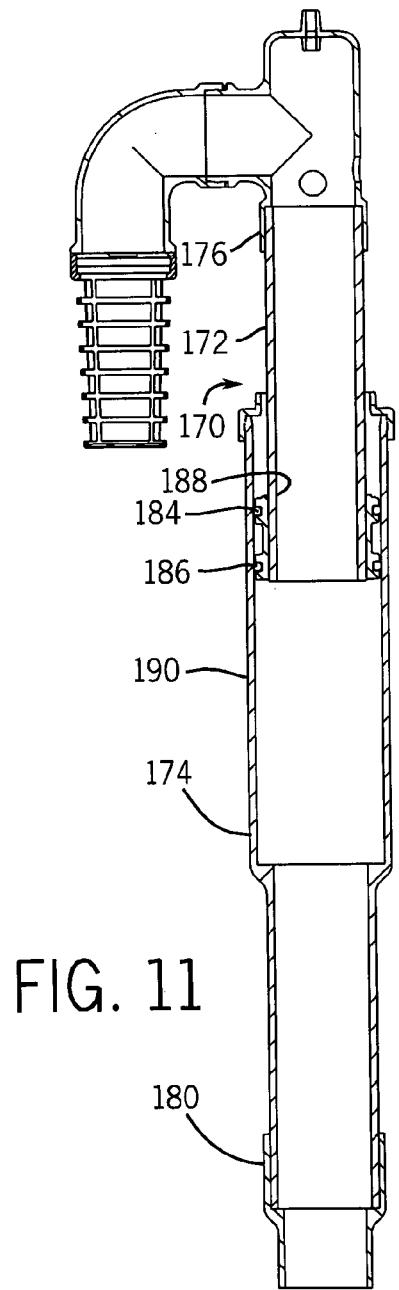
FIG. 11 is a sectional view of the standpipe of FIG. 10.
Figures 12, 13:
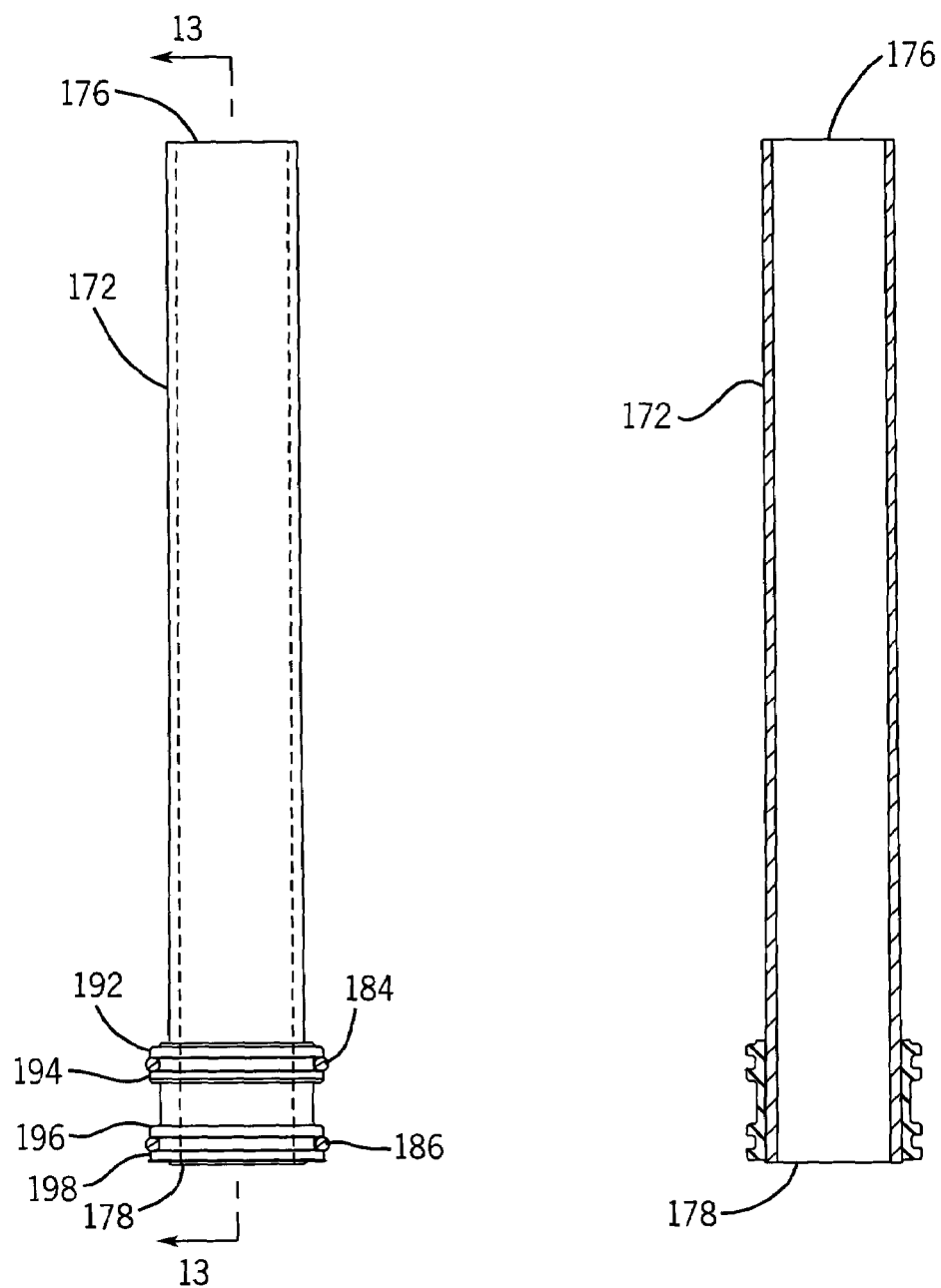
FIG. 12 is a side elevation view of one of the components of FIG. 10.
FIG. 13 is a sectional view taken along line 13—13 of FIG. 12.
Figure 14:
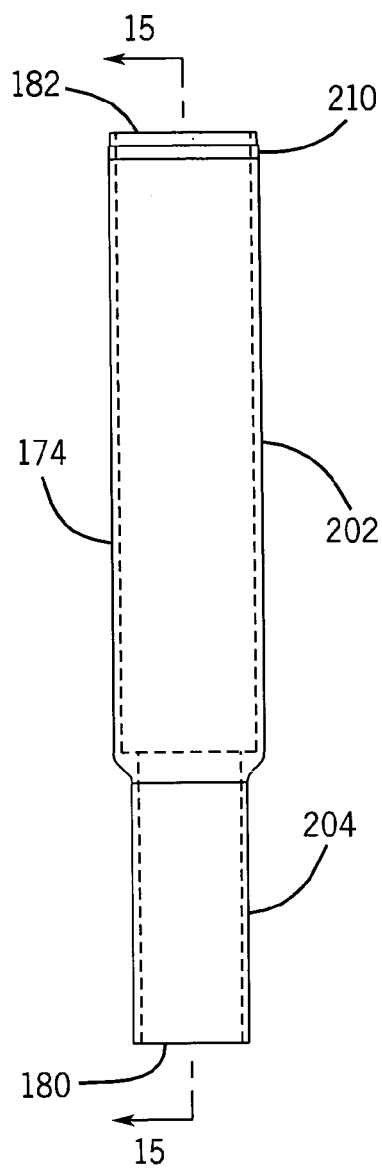
FIG. 14 is a side elevation view of another component of FIG. 10.
Figure 15:
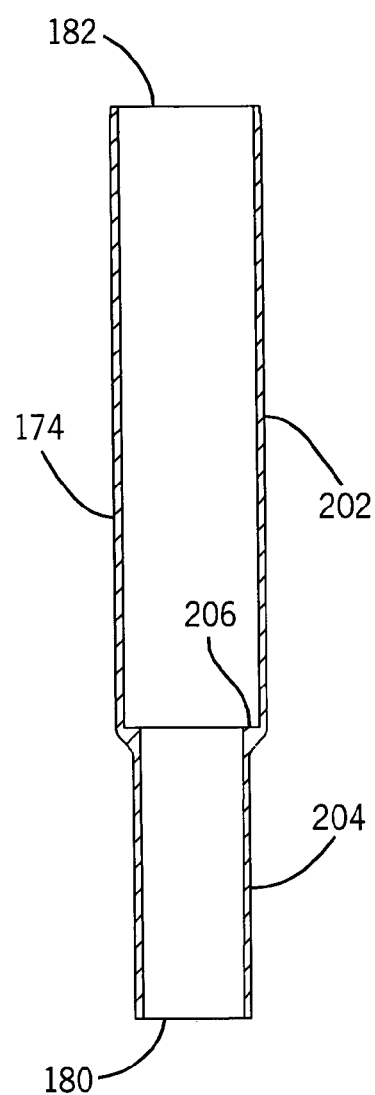
FIG. 15 is a sectional view taken along line 15—15 of FIG. 14.

FIG. 1 shows an overflow system 20 for an aquarium tank 22. In general, the overflow system operates as shown in U.S. Pat. No. 5,626,747, incorporated herein by reference. Water flows from the tank interior 24 along top, middle and bottom flow paths 26, 28, 30, respectively, through respective top, middle and bottom inlets 32, 34, 36 of pre-overflow wall 38 into mixing chamber 40, which is comparable to mixing chamber 34 in the incorporated '747 patent. The water then spills over the top of overflow wall 42 into reservoir 44 and then flows through standpipe 46 as shown at arrows 48, 50, and then out of the tank as shown at arrow 52 to filter 54 and pump 56, and then is returned as shown at arrow 58 to the tank through return tube 60 for discharge back into the interior 24 of the tank as shown at arrow 62. Overflow walls 38 and 42 around tubes 46 and 60 may be in a corner of the tank as shown in FIG. 1 of the '747, or may be along a sidewall of the tank as shown in FIG. 11 of the '747 patent. An overflow system is also shown in U.S. Pat. No. 5,942,105, incorporated herein by reference. FIG. 2 herein shows the overflow system along a side wall 64 of aquarium tank 22.

Standpipe 46 has an upper end 66 for receiving overflow water above a given level in the aquarium tank 22, and a lower end 68 for directing the overflow water through a tank wall, such as bottom wall 70. A first elbow 72 has an outlet end 74 mounted to upper end 66 of the standpipe, preferably by press-fit. Elbow 72 has an inlet end 76. A second elbow 78 has an outlet end 80 snap-fit mounted, to be described, to inlet end 76 of elbow 72. Elbow 78 has an inlet end 82 receiving overflow water. A strainer 84, in the form of a hollow ribbed cage or the like, is snap-fit mounted, to be described, to inlet end 82 of elbow 78. A standpipe base 86 is press-fit mounted to lower end 68 of standpipe 46 for directing overflow water through tank wall 70. Base 86 is mounted to the tank wall at bulkhead 88 extending through annular seal or gasket 90 and aperture 92 in bottom tank wall 70 and secured thereto by bulkhead nut 94 having either an elbow insert 96 or a straight insert 98 extending therefrom and bonded thereto by adhesive, and delivering water to filter 54 as shown at arrow 52. The mounting and sealing through the bottom tank wall is standard and known in the prior art. Return tube 60 is mounted to bulkhead 100, preferably by bonding adhesive, and the bulkhead extends through annular seal or gasket 102 and through aperture 104 in bottom tank wall 70 and is secured by bulkhead nut 106 having either an elbow insert 108 or a straight insert 110 extending therefrom and bonded thereto by adhesive, and receiving water from pump 56 as shown at arrow 58. The upper end of return pipe 60 is adhesively bonded to an elbow 112 having a flexible nozzle or hose 114 extending therefrom and over walls 42 and 38 to return the water to the interior 24 of the tank as shown at arrow 62.

Figure 9:
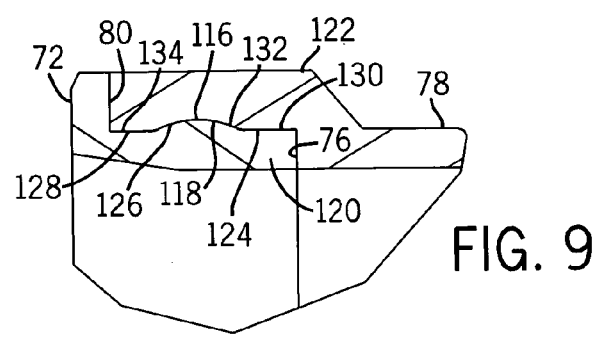
FIG. 9 is an enlarged sectional view of portions of FIGS. 4 and 6 in assembled condition.

As noted above, elbow 78 is snap-fit mounted to elbow 72, and strainer 84 is snap-fit mounted to elbow 78, FIGS. 3–8. FIG. 9 is an enlarged view of a portion of elbows 72 and 78 in assembled condition. One of the inlet end of elbow 72 and the outlet end of elbow end 78, preferably outlet end 80 of elbow 78, has an annular recess 116. The other of the inlet end of elbow 72 and the outlet end of elbow 78, preferably inlet end 76 of elbow 72, has an annular bump 118. Annular bump 118 fits in annular recess 116 in snap-in insertion engagement, i.e. axially left-right in the orientation of FIGS. 3–9, holding elbows 72 and 78 in assembled condition. Elbows 72 and 78 engage in an axial insertion direction, i.e. left-right in FIG. 9, in telescoped relation along male and female sleeve portions 120 and 122, respectively. Male sleeve portion 120 has first, second and third sections 124, 126 and 128. Female sleeve portion 122 has fourth, fifth and sixth sections 130, 132 and 134. First and third sections 124 and 128 have outer diameters substantially equal to each other. Fourth and sixth sections 130 and 134 have inner diameters substantially equal to each other and substantially equal to the outer diameters of first and third sections 124 and 128. Second section 126 is axially between first and third sections 124 and 128 and provides one of the noted bump and recess, preferably bump 118. Fifth section 132 is axially between fourth and sixth sections 130 and 134, and provides the other of the noted bump and recess, preferably recess 116. In like manner, one of the strainer 84 and the inlet end 82 of elbow 78, preferably strainer 84, has an annular recess 136. The other of the strainer and the inlet end of elbow 78, preferably inlet end 82 of elbow 78, has an annular bump 138. Bump 138 fits in annular recess 136 in snap-in insertion engagement holding strainer 84 and elbow 78 in assembled condition. The detailed construction of bump 138 and recess 136 is like that shown in FIG. 9. Strainer 84 depends downwardly from inlet end 82 of elbow 78 at a level below the upper end 66 of standpipe 46. Elbow 72 at inlet 76 has an outer raised annular lip or shoulder 140 for stopping axial insertion of outlet end 80 of elbow 78. Elbow 78 has an outer raised annular lip or shoulder 142 for stopping insertion of strainer 84.

Elbow 72 has an air vent 144 spaced from elbow inlet 76. Air vent 144 admits air into elbow 72 at a location spaced from inlet 76 and relieves pressure drop in the elbow and the standpipe otherwise sucking and gurgling air through elbow inlet 76. Air vent 144 also permits escape of air therethrough from the interior of the elbow and standpipe in the case of the opposite pressure differential, i.e., if the internal pressure within the elbow is higher than the external ambient pressure outside of the elbow, then such pressure may be relieved by escape of air through air vent 144 from the interior of the elbow. Air vent 144 is at a level above elbow inlet 76. Elbow 72 includes a first leg 146, FIG. 4, extending upwardly from upper end 66 of standpipe 46, a second leg 148 extending laterally from first leg 146 and receiving overflow water from elbow inlet 76, and a third leg 150 extending upwardly from the junction 152 of the first and second legs 146 and 148. Air vent 144 is in leg 150. Leg 150 includes a wall 154 defining an internal chamber 156 communicating with junction 152. Air vent 144 is provided by a tube 158 extending through and beyond wall 154. Wall 154 has distally oppositely facing interior and exterior surfaces 160 and 162, respectively. Tube 158 extends beyond both surfaces 160 and 162, namely interiorly in a first direction (downwardly in FIG. 5) beyond interior surface 160, and exteriorly in a second opposite direction (upwardly in FIG. 5) beyond exterior surface 162. This stand-off extension of the air vent tube has been found to reduce whistling noise otherwise encountered as water is flowing through elbow 72 and standpipe 46.

A set of one or more apertures 164, 165, 166 are provided in elbow 72 and extend through the sidewall thereof at a level below air vent 144. Air vent 144 has an inner diameter, and each of apertures 164–166 has an inner diameter substantially larger than the inner diameter of air vent 144 and enabling passage of both air and water through apertures 164–166. Apertures 164–166 are at or below junction 152. Apertures 164–166 are preferably at different levels, e.g. aperture 164 in FIG. 4 is at a slightly lower level than aperture 165. Inlet 82 of elbow 78 is at a level below apertures 164–166.

FIGS. 10–17 show another embodiment, and use like reference numerals from above where appropriate to facilitate understanding. Standpipe 46 of FIGS. 1–9 is replaced by a standpipe 170 provided by an upper tubular member 172 telescopically engaging and slidable along a lower tubular member 174, to provide an adjustable height standpipe for varying the height of upper standpipe end 176. Upper tubular member 172 has a top end providing the noted upper end 176 of the standpipe, and has a bottom end 178. Lower tubular member 174 has a bottom end 180 providing the lower end of the standpipe, and has a top end 182 above bottom end 178 of upper tubular member 172. One or more friction resistance members, preferably provided by resiliently compressible O-rings 184, 186, FIG. 12, engage upper and lower tubular members 172 and 174 and apply frictional resistance therebetween to maintain a desired height of upper tubular member 172 relative to lower tubular member 174. The upper and lower tubular members 172 and 174 have overlapping inner and outer concentric sections 188 and 190, respectively. The noted resiliently compressible members provided by O-rings 184 and 186 bear between inner and outer concentric sections 188 and 190. The O-rings are mounted to one of the inner and outer concentric sections, preferably to inner section 188 if the latter is part of upper member 172, and are held between respective annular raised ridges 192 and 194, and 196 and 198. The O-rings are slidable along the other of the inner and outer concentric sections, which in the given example is outer section 190.

Figure 10:
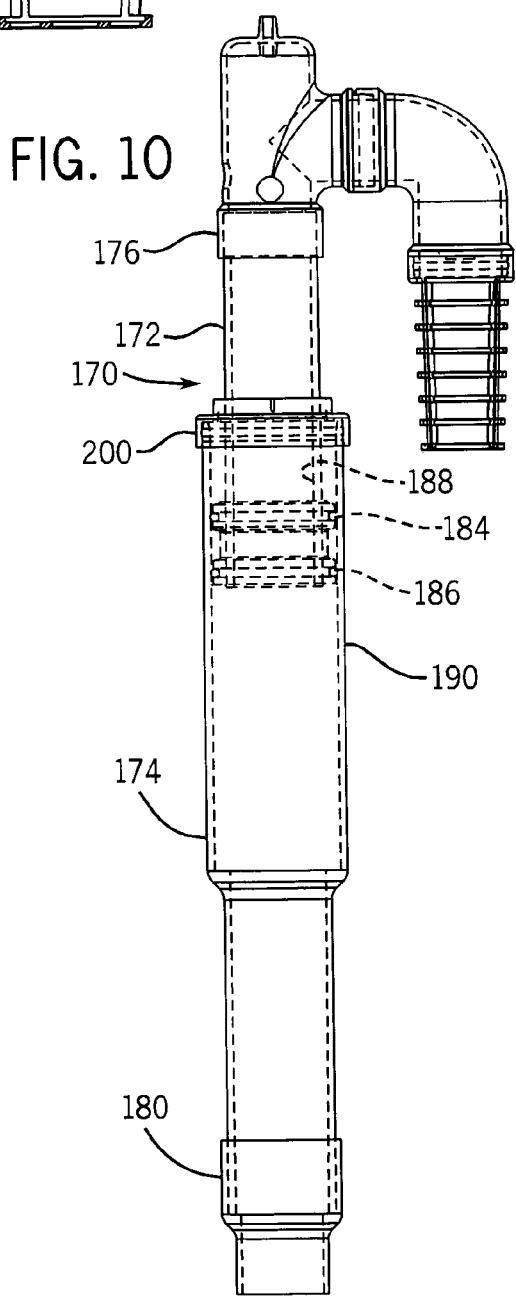
FIG. 10 is a side elevation view of an alternate embodiment of a standpipe in accordance with the invention.
Figure 16:
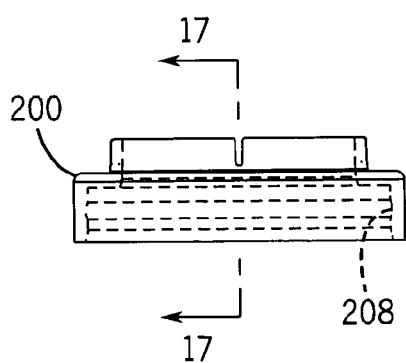
FIG. 16 is a side elevation view of another component of FIG. 10.
Figure 17:
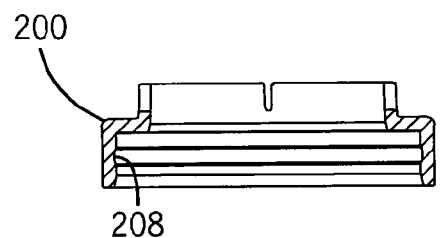
FIG. 17 is a sectional view taken along line 17—17 of FIG. 16.

A collar 200, FIGS. 10, 16, 17, is provided at one of the top end of the lower tubular member and the bottom end of the upper tubular member, preferably the top end 182 of lower tubular member 174, and engages the other of the upper and lower tubular members, preferably upper tubular member 172, for guiding telescopic movement therealong. One of the upper and lower tubular members has upper and lower sections of different diameter meeting at a step shoulder providing a stop engageable with one of the ends of the other of the upper and lower tubular members and limiting telescopic movement of the upper and lower tubular members. In the preferred embodiment, lower tubular member 174 has upper and lower sections 202 and 204 of different diameter meeting at a step shoulder 206, FIG. 15, engageable with bottom end 178 of upper tubular member 172 and limiting telescopic movement of upper and lower tubular members 172 and 174 towards each other, to in turn set the lower limit of the travel stroke of upper tubular member 172 and in turn the lower limit of the water level by limiting the downward travel of top end 176 of upper tubular member 172. Collar 200 is preferably snap-fit mounted to top end 182 of lower tubular member 174, by an annular recessed 208 in the internal diameter of the collar, and annular bump 210 on the outer diameter of lower tubular member 174, which construction is like that described above, for example as shown in FIG. 9.

It is recognized that various equivalents, alternatives and modifications are possible within the scope of the appended claims.

What is claimed is:

1. An aquarium overflow system comprising a standpipe having an upper end for receiving overflow water above a given level in an aquarium tank, and a lower end for directing the overflow water through a tank wall, an elbow having an elbow outlet mounted to said upper end of said standpipe, and having an elbow inlet, an air vent in said elbow, a set of one or more apertures in said elbow at a level below said air vent, wherein said elbow comprises a first leg extending upwardly from said upper end of said standpipe, and a second leg extending laterally from said first leg and receiving overflow water from said elbow inlet, wherein said one or more apertures are at or below the junction of said first and second legs.

2. The aquarium overflow system according to claim 1 comprising a plurality of apertures in said elbow at different levels below said junction of said first and second legs.

3. The aquarium overflow system according to claim 1 wherein said elbow comprises a first elbow, and comprising a second elbow having an outlet mounted to said inlet of said first mentioned elbow, and having an inlet receiving said overflow water, said inlet of said second elbow being at a level below said one or more apertures in said first elbow, said one or more apertures in said first elbow being at a level between said junction of said first and second legs and said inlet of said second elbow.

* * * * *